(12) United States Patent
Ahlstrom et al.

(10) Patent No.: US 6,418,468 B1
(45) Date of Patent: *Jul. 9, 2002

(54) AUTOMATICALLY VERIFYING THE FEASIBILITY OF NETWORK MANAGEMENT POLICIES

(75) Inventors: John K. Ahlstrom, Cupertino; Stephen I. Schleimer, San Jose, both of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/904,274

(22) Filed: Jul. 11, 2001

Related U.S. Application Data

(63) Continuation of application No. 09/205,833, filed on Dec. 3, 1998, now Pat. No. 6,301,613.

(51) Int. Cl.$^7$ .............................................. G06F 13/00
(52) U.S. Cl. ........................................................ 709/223
(58) Field of Search ................................. 709/220–226; 707/4–5, 104; 370/254

(56) References Cited

U.S. PATENT DOCUMENTS

| | | |
|---|---|---|
| 5,557,747 A | 9/1996 | Rogers et al. |
| 5,797,128 A | 8/1998 | Birnbaum |
| 5,832,503 A | 11/1998 | Malik et al. |
| 5,872,928 A | 2/1999 | Lewis et al. |
| 5,889,953 A | 3/1999 | Thebaut et al. |
| 5,950,195 A | 9/1999 | Stockwell et al. |
| 5,968,176 A | 10/1999 | Nessett et al. |
| 6,064,656 A | 5/2000 | Angal et al. |
| 6,125,390 A | 9/2000 | Touboul |
| 6,167,445 A | 12/2000 | Gai et al. |

OTHER PUBLICATIONS

Kumar, Vipin, et al., "Algorithms for Constraint Satisfaction Problems: A Survey", AI Magazine 13(1):31–44, 1992.
B. Aiken, et al., "Network Policy and Services: A Report of a Workshop on Middleware", RFC 2768, Feb. 2000, pp. 1–29.
D. Durham, et al., "The COPS (Common Open Policy Service) Protocol", RFC 2748, Jan. 2000, pp. 1–38.

Primary Examiner—David Wiley
(74) Attorney, Agent, or Firm—Hickman Palermo Truong & Becker LLP; Craig G. Holmes

(57) ABSTRACT

A method and apparatus are provided for verifying policies that govern a policy-based system. The method and apparatus may be implemented as a policy verifier that acts upon one or more policies. Each policy comprises a condition and a consequent. The policy verifier acquires configuration information about the system under management, thereby acquiring an understanding of the system. The policy verifier determines whether all the policies are feasible for the system, and if not, reports problems or errors that cause the policies to be non-feasible. The policy verifier also verifies that a configuration required by a particular policy consequent can be actually carried out by the managed system. In one embodiment, the policy verifier operates on network management policies, of a policy-based network management system. As a result, the invention improves the accuracy and safety of policies prepared for a network that previously did not use policy-based management.

23 Claims, 4 Drawing Sheets

AUTOMATICALLY VERIFYING THE FEASIBILITY OF NETWORK MANAGEMENT POLICIES

RELATED APPLICATION

This application claims domestic priority as a continuation application from prior U.S. non-provisional application Ser. No. 09/205,833, filed Dec. 3, 1998, now U.S. Pat. No. 6,301,613, the entire disclosure of which is hereby incorporated by reference for all purposes as if fully set forth herein.

FIELD OF THE INVENTION

The present invention relates to data processing. The invention relates more specifically to computer systems or software systems that manage computer networks, and that can automatically generate, test, and verify network management policies for a network.

BACKGROUND OF THE INVENTION

Computer networks have become ubiquitous in the home, office, and industrial environment. As computer networks have grown ever complex, automated mechanisms for organizing and managing the networks have emerged. These mechanisms are generally implemented in the form of one or more computer programs, and are generically known as network management systems or applications.

FIG. 1 is a simplified diagram of a network 100 that is managed by a network management system running on one or more network management stations 10. The network 100 comprises one or more network devices 102, such as switches, routers, bridges, gateways, and other devices. Each network device 102 is coupled to another network device 102, or to one or more end stations 120. Each end station 120 is a terminal node of the network 100 at which some type of work is carried out. For example, an end station 120 is a workstation, a printer, a server, or similar device.

Each network device 102 executes a network-oriented operating system 110. An example of a network-oriented operating system is the Internetworking Operating System (IOS) commercially available from Cisco Systems, Inc. Each network device 102 also executes one or more applications 112 under control of the operating system 110. The operating system 110 supervises operation of the applications 112 and communicates over network connections 104 using one or more agreed-upon network communication protocols, such as Simple Network Management Protocol (SNMP).

Each device 102 stores information about its current configuration, and other information, in one or more forms, for example, a Management Information Base (MIB) 114. Information in the MIB 114 is organized in one or more MIB variables. The network management station 10 can send "fetch" and "set" commands to the device 102 in order to retrieve or set values of MIB variables. Examples of MIB variables include sysObjectID and sysDescr. For information stored in other forms, there are other types of communications and commands to set and retrieve the information values.

Preferably the network management station 10 is a general-purpose computer system of the type shown and described further herein in connection with FIG. 3. The network management station 10 executes one or more software components that carry out the functions shown in block diagram form in FIG. 1. For example, the network management station 10 executes a basic input/output system (BIOS) 20 that controls and governs interaction of upper logical layers of the software components with hardware of the network management station. An example of a suitable BIOS is the Phoenix ROM BIOS. The network management station 10 also executes an operating system 30 that supervises and controls operation of upper-level application programs. An example of a suitable operating system is the Microsoft Windows NT® operating system. The network management station 10 may also execute other operating systems that may not require a BIOS 20, such as UNIX-type operating systems, microkernel-based operating systems, etc.

The network management station 10 executes an asynchronous network interface (ANI) 50 under control of the operating system 30. The ANI 50 provides an interface to the network 100 and communicates with the network using SNMP or other agreed-upon protocols. The ANI 50 provides numerous low-level services and functions for use by higher-level applications.

The network management station 10 executes a network management system 40 that interacts with an information base 60 containing information about the managed network 100. The information base may be implemented on one or more of: relational data bases, object data bases, directories, flat file systems, ISAM file systems, etc. The network management system 40 is an example of a network management application. Using a network management application, a manager can monitor and control network components. For example, a network management application enables a manager to interrogate devices such as host computers, routers, switches, and bridges to determine their status and to obtain statistics about the networks to which they attach. The network management application also enables a manager to control such devices by changing device configuration or operation information, for example, routes and configuring network interfaces. Examples of network management applications are Cisco Works, Cisco Works 2000, and Cisco View, each of which is commercially available from Cisco Systems, Inc.

The ANI 50 and network management system 40 need not execute or reside on the same physical computer. They may execute on different machines. There need not be only one ANI 50 or only one network management system 40.

The behavior of some network management applications or equipment may be governed by one or more abstract policies. A network management policy expresses a business goal for use of the network; the network management application can convert the policy into instructions to network devices, such as switches, routers, and other hardware and software, to implement the policy. An example of a policy is: "All administrative assistants may use the World Wide Web only between 11 a.m. and 3 p.m., Monday through Friday." A system that can receive and act on such policies is sometimes called a policy-based network management system.

Policy-based management is used in other, specific contexts within the broad field of network management. For example, Cisco Centri Firewall software product, commercially available from Cisco Systems, Inc. of San Jose, Calif., is a policy-driven product. The use of policies to control a firewall is disclosed in co-pending U.S. patent application Ser. No. 60/074945, filed Feb. 17, 1998, entitled "Graphical Network Security Policy Management," and naming Scott L. Wiegel as inventor.

Other information about policy-based networking is described in CiscoAssure Policy Networking: Enabling Business Applications through Intelligent Networking, http://www.cisco.com/warp/public/734/capn/assur sd.htm (posted Jun. 13, 1998); CiscoAssure Policy Networking End-to-End Quality of Service, http://www.cisco.com/warp/public/734/capn/caqos wp.htm (posted Jun. 24, 1998); Delivering End-to-End Security in Policy-Based Networks, http://www.cisco.com/warp/public/734/ capn/deesp wp.htm (posted Sep. 11, 1998); User Registration and Address Management Services for Policy Networking, http://www.cisco.com/warp/public/ 734/capn/polnt wp.htm (posted Sep. 11, 1998); CiscoAssure User Registration Tool, http://www.cisco.com/warp/public/734/capn/caurt ai.htm (posted Oct. 8, 20 1998).

Not all existing networks, however, use policy-based networking. A large number of networks and network devices that are installed in the field do not have policy-based network management systems. Policy-based network management systems are being rapidly added to such networks; however, there is a risk that the policy-based network management system will damage the network or erroneously configure network devices, because the policy-based network management system does not fully understand the current configuration of the network. To convert a non-policy-based network to a network with a policy-based network management system, an administrator may have to or want to manually write, evaluate, and verify one or more policies that reflect the actual configuration of the system. There is a risk that a policy will attempt to make a change to the network that cannot be satisfied by the network or is infeasible.

For example, a policy-based management system may assume the availability of access control lists within a particular range of values for its own purposes, regardless of whether another system is using the same range for a different purpose. In the prior approaches, the management system essentially forces the managed system to use the range of values required by the management system, because the management system has no way to find out that another system previously has used a conflicting range.

As another example, the specifications for a particular set of network devices may dictate that if the devices are configured to execute weighted random early discard on a particular interface, the devices cannot concurrently do priority queuing, and that only weighted fair queuing may be used at the same time. Then a policy is installed that requests priority queuing in violation of such specifications. Suddenly, the network does not work as intended, perhaps in an undefined way, simply because the policy-based system did not determine the configuration requirements of the network before enforcing the policy.

Based on the foregoing, there is a clear need in this field for a policy-based network management system to automatically understand the configuration of an existing network.

Moreover, even in a network system that does use policy-based networking and is largely or completely configured using policies, it is still safer and easier to manage using policies when the policy system can understand the existing configuration. Thus, there is a need to provide such policy-based networking systems with an automatic way to detect and understand the current network configuration.

In the prior approaches, when a policy is manually prepared and intended to reflect the configuration of a non-policy-based network, the administrator has no easy way to verify that the new policy will work with the equipment and services to which it is to be applied. Thus, there is also a need for an automatic way to determine when one policy satisfies the capabilities of the equipment and services to which it is to be applied.

Another disadvantage of the prior approaches is that there is no way to determine whether the manually prepared policy is "feasible" when the network is in operation. For example, the network may have sufficient resources to satisfy a particular request, but insufficient resources to satisfy all the possible number of requests, such that the policy is infeasible. Thus, there is also a need for an automatic way to determine when one policy is feasible.

Still another disadvantage of the prior approaches is that there is no way to compare the requirements, constraints and configurations specified by the result or "consequent" of a policy with the actual configurations present in the network, its equipment or services. For example, an administrator may manually prepare a policy that says, "Upon condition X, set up service Y," but the network under management has no way to set up service Y. Therefore, there is a need for an automatic way to verify that the configuration demanded by a policy is possible, and to report differences and discrepancies in what the policy demands compared to what is possible in the network.

The foregoing needs exist in any policy-based system, not just in policy-based network systems. There is a particular need, however, for such a system, mechanism or process that can be used in the context of a network management application that manages a network of data communication devices or computer devices.

SUMMARY OF THE INVENTION

The foregoing needs and objectives, and other needs and objectives that will become apparent in the following description, are achieved by the present invention, which comprises, in one aspect, a method of verifying a policy used by a management system that manages a computer system, comprising the computer-implemented steps of receiving configuration information that identifies one or more devices in the computer system and one or more characteristics of each of the devices; verifying that the computer system can satisfy the policy, based on the configuration information; verifying that the policy is feasible for use with the computer system, based on the configuration information; verifying that conditions and consequent actions of the policy may be applied to the computer system, based on the configuration information; and applying the policy to the computer system.

In another aspect, the invention provides a method of a verifying a policy used by a management system that manages a network, comprising the steps of (A) receiving information identifying a configuration of a network under management and for converting the configuration information into a standard format; (B) receiving information defining the policy, the policy comprising a condition and a consequent to be applied to the network when the condition is true; (C) comparing the policy with the configuration information to determine whether the network can satisfy the condition and the consequent of the policy; (D) comparing the policy with the configuration information to determine whether the policy is feasible when applied to the network; and (E) generating information that identifies whether the policy is satisfiable and feasible.

One feature of this aspect is that step (C) further comprises the steps of reporting whether, and if not why not, the policy can be applied to the network. Another feature is that step (D) further comprises the steps of reporting whether, and if not why not, the policy is unfeasible as applied to the network. Yet another feature is that step (E) further comprises the steps of comparing requirements, constraints and configurations specified by policies with the actual configurations of equipment or services of the network.

According to other aspects, the invention provides a computer-readable medium and a network management policy verification apparatus that are configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
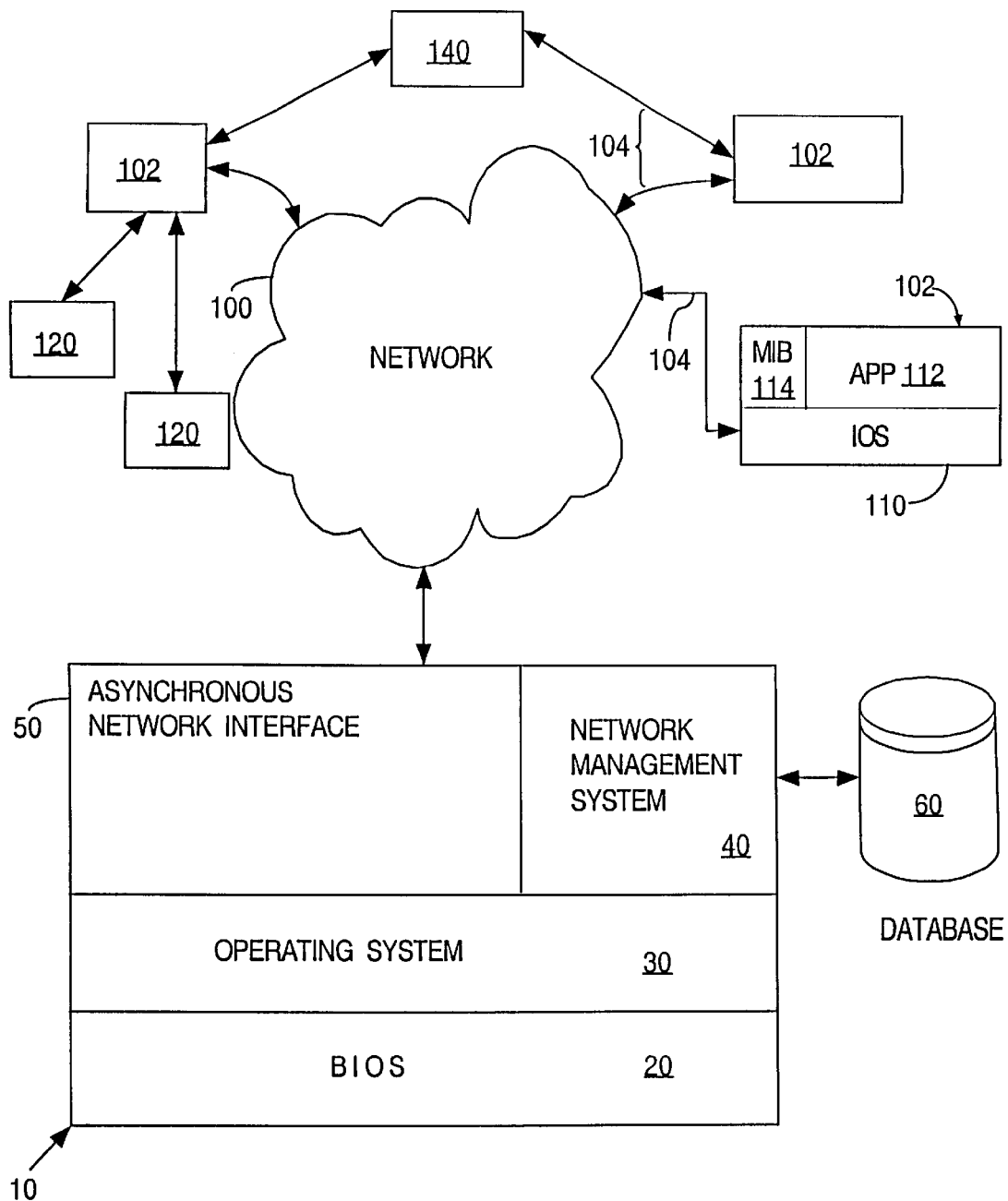
FIG. 1 is a simplified diagram of a network that is managed by a network management station.

A method and apparatus for recognizing and processing policy conflicts is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW

Collections of network equipment and services that are already installed and in service have been configured outside of new, policy-based networking systems that have recently become available. Managing these collections using policies is easier and safer when the policy system understands the existing configuration before making changes to it. In this context, "configuration" refers to the dynamic state of a system as it is executing or being used, as well as to the static variables and other parameters that define the start-up state or initialization state of the system.

For systems that are largely configured using policies, it is still safer and easier to manage using policies when the policy system can understand the existing configuration.

Accordingly, one aspect of the preferred embodiment provides a computer-implemented method of causing a policy-based management system to (1) understand the configuration of the system under management; (2) determine that a particular policy is "satisfiable" in the managed system; (3) determine that a particular policy is "feasible" in the managed system; and (4) verify or validate the requirements of the policy with the capabilities of the managed system. In one exemplary embodiment, the invention is implemented in the context of a policy-based network management system, and the "managed system" is a network of devices such as routers and switches. The invention is equally applicable, however, to any policy-based system.

In one embodiment, a policy verification method operates in concert with a network management system. The method may be implemented as one or more computer programs, processes, objects, or routines. In this configuration, the method enhances Policy-Based Networking.

POLICY-BASED NETWORKING

Policy-Based Networking enables network administrators to specify network behavior in a collective, declarative manner at a high level of abstraction and granularity. Policy management makes it Possible, Safe and Comfortable to specify network behavior in this way. In this context, "Possible" means that the actions and states of affairs expressed in a policy can be implemented. "Safe" means that the actions and states of affairs expressed in multiple policies will not conflict with each other, will not damage the network, and not reduce the flow of traffic below desired/required levels. "Comfortable" means that the administrator may be confident that the changes are possible and safe.

A "Policy" is a declarative statement of intention about how a policy-driven system shall be configured or behave. A policy may be expressed in terms of a Policy Condition and a Policy Consequent. When the Condition is met, the Consequent is performed. More specifically, policy statements are declarative statements made by network administrators defining conditions and actions or states of affairs they want taken or established when the condition is fulfilled by something in the network. For example, a Policy is:

If source in [TrainingServers] & destination in [ClassRooms] & time between [700 & 1759] then VideoLT100

Generally, a Policy Condition is a Boolean expression defining the situation under which the policy system is to attempt to establish the consequent. The Condition is a Boolean expression that may comprise relations between Condition Categories and Condition Elements. Condition Categories may be predefined kinds of things that can be evaluated in conditions, for example, service, user, time, and other things. Condition Elements are customer-defined values of predefined categories of "things" in or about the network. A Policy Consequent is a state of affairs that is to be brought about when the policy condition is satisfied, or an action that is to be taken or attempted when the policy condition is satisfied.

VERIFYING NETWORK MANAGEMENT POLICIES

Figure 2A:
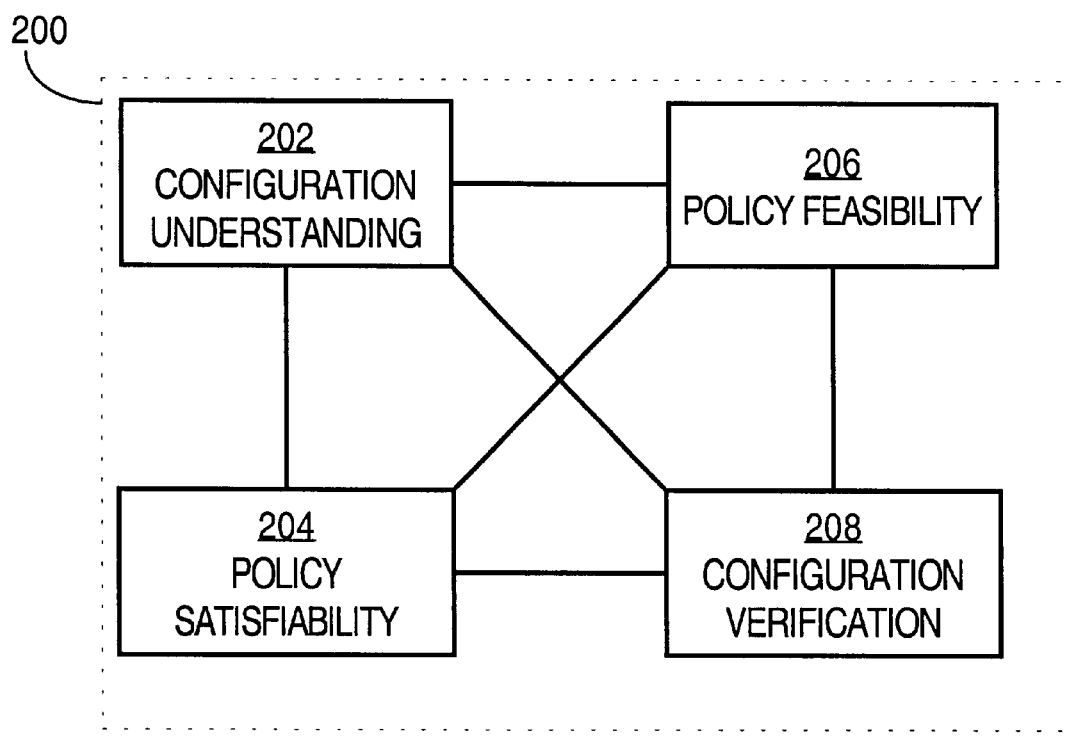
FIG. 2A is a flow diagram of a process of verifying network management policies.

FIG. 2A is a diagram of processes involved in network management policy verifier 200. The policy verifier 200 may be implemented as one or more software elements. Preferably, the policy verifier 200 comprises a Configuration Understanding element 202, a Policy Satisfiability element 204, a Policy Feasibility element 204, and a Configuration Verification element 206.

The Configuration Understanding element 202 is a means to read the relevant parts of the configuration of equipment and services that are to be managed by the policy system and to translate idiosyncratic representations into standard forms that the rest of the system can deal with. In this context, "configuration" is the state of a network device, which may be discovered in a variety of ways. The "standard forms" are formally defined, machine-processable, representations of the idiosyncratic representations contained in the actual equipment. The form, content and meaning of the standard form representations are all formally defined. Generally there is a many to one relationship between idiosyncratic and standard forms. Only the representation standardization mechanism of the system must deal with the idiosyncrasies and, then, only to translate to a standard form. All other components of the system read and understand the standard forms. The "standard forms" may be one or more rules or tables that define the configuration of devices in the network. For example, the configuration of a network may be stored as values in tables of a relational database system, in which each table is associated with a characteristic of a device. The configuration information may also be stored in persistent object structures in computer memory.

The Policy Satisfiability element 204 is a means to compare the requirements of a policy with the capabilities of the equipment and services to which it is to be applied. If a Condition expressed in a policy can be satisfied within the network, and the Consequent can be satisfied within the network at least once, then the policy is "satisfiable." For example, consider a policy of the form, "If Source in R&Dlaboratory then AllowInternetAccess." The Policy Satisfiability element 204 is responsible for checking whether the configuration of the network, which was obtained by the Configuration Understanding Element 202, contains a Source object, an R&Dlaboratory object, and an AllowInternetService service object. If all such objects are recognized in the configuration, then the policy is considered "Satisfiable." The determination of whether a policy is satisfiable is carried out based on the configuration information that is discovered and acquired by the Configuration Understanding element 202. Satisfiability may be viewed as a static analysis of the resources of the network which would indicate that the services that policy intends to provide can be accommodated by the network resources.

In some embodiments, the Policy Satisfiability element 204 may also provide a means to report whether or not, and if not why not, the policy can be applied to the equipment and services. For example, when the policy verifier 200 is implemented in the context of a network management that has a graphical user interface, the Policy Satisfiability element 204 may display a dialog box that contains the non-satisfiable policy and an error message or other explanation of why the policy is non-satisfiable.

Now suppose further, for the above policy, that the service object "AllowInternetService" can establish only 100 Internet connections, due to external constraints on bandwidth or subscription quantity, that there are 500 employees at the network site under management, and all employees use the Internet every day. Obviously, although the policy is satisfiable in the abstract, it is not practical or feasible. The Policy Satisfiability element 204 makes no attempt to determine whether the policy is feasible. The Policy Feasibility element 206, however, provides a means to estimate the possibility that a satisfiable policy can be implemented. Thus, whereas the Policy Satisfiability element 204 verifies a policy in a static sense, the Policy Feasibility element 206 evaluates a policy in a dynamic sense. Feasibility may be viewed as a dynamic analysis that computes an estimate of whether a system will be able to satisfy a particular policy, taken in concert with all other policies defined for the system and that may use similar resources.

In one embodiment, the Policy Feasibility element 206 accomplishes this by comparing the maximum possible number of requesters of a service to the minimum possible amount of the service available. If the maximum possible number of requesters is greater than the amount or service, the policy may not be feasible in the circumstances when the actual number of requestors exceeds the actual amount available. The determination of whether a policy is feasible is carried out based on the configuration information that is discovered and acquired by the Configuration Understanding element 202.

For example, consider a network management system in which 25 policies are defined, each of which has the consequent of reserving 10Mbits on a 100Mbit channel. Each rule is statically satisfiable, but together the rules are unfeasible. Accordingly, the Policy Feasibility element 206 examines each policy and stores information that describes the consequents of the policy. The Policy Feasibility element 206 then compares the consequents to the configuration information in order to determine whether the policies are feasible. In the example above, the Policy Feasibility element 206 would recognize that the consequents each request a portion of a channel with a fixed maximum bandwidth. Based on the type of the consequent—a reservation of bandwidth—the Policy Feasibility element 206 would sum all the consequents of all the policies and compare the result to the known maximum bandwidth value, which was acquired by the Configuration Understanding element 202. Exceeding the maximum bandwidth would be trapped and reported as an error, for example, by notifying the policy definition and administration console and requesting the user to change one or more of the policies.

The Configuration Verification element 208 provides a means to compare the requirements, constraints and configurations specified by policies with the actual configurations present in the collection of equipment and services. The Configuration Understanding element 202 is responsible to determine the actual current network configuration, whereas the Configuration Verification element 208 is responsible to verify that the conditions and consequents of each policy are actually possible to apply to the network. In particular, Configuration Verification compares consequents to the current configuration, whereas the other elements compare consequents and conditions to each other. In one embodiment, the Configuration Verification element 208 also provides a means to report differences and discrepancies, possibly with suggestions about their relative importance and suggestions about how to resolve them. For example, the Configuration Verification element 208 may report that when a particular policy is executed in a network, it will produce undefined results, results that are not recommended, or that it will not work at all.

Figure 2B:
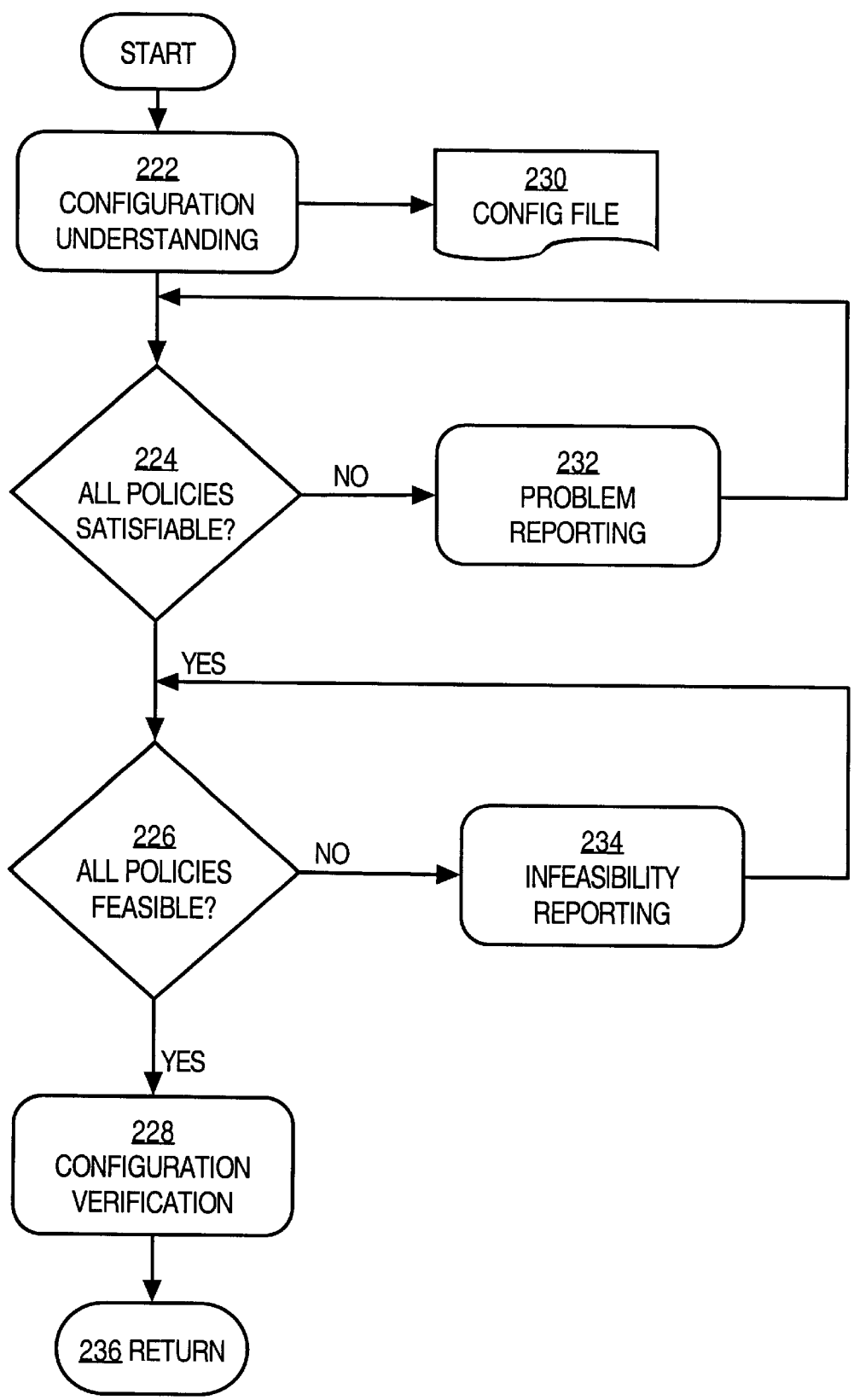
FIG. 2B is a flow diagram of an embodiment of certain steps in the process of FIG.2A.

FIG. 2B is a flow diagram of a method of recognizing and processing conflicts in policies that govern a policy-based system.

In block 222, the process carries out a configuration understanding step. Block 222 may involve invoking one or more external processes that discover information about devices in a managed network. For example, a discovery process can use SNMP commands to query devices in the network and receive copies of values stored in their MIBs, for example, one or more MIB variable values. Block 222 also involves converting the values that are received into a standard format that can be accessed and understood by other steps in the process of FIG. 2B. This may involve, for example, storing the values in a configuration file 230, or storing the values in an object model in memory. It is desirable, but not required, to have a complete, standard representation of configuration information that is stored in a way that can be uniformly retrieved by other steps of the process of FIG. 2B. Block 222 may also involve carrying out the functions described above with respect to Configuration Understanding element 202.

Acquiring the configuration information enables the other steps of the process of FIG. 2B to understand whether a particular policy will operate correctly with the network under management.

In block 224, the process tests whether the policies that have been defined to control the network are satisfiable with respect to the network. Block 224 may involve the steps of receiving one or more previously defined network management policies. Block 224 may also involve carrying out the functions described above with respect to Policy Satisfiability element 204. These steps may be performed iteratively for each policy that is defined in the system. When a non-satisfiable policy is detected, the existence of a problem is reported, as shown by block 232. The problem reporting steps may involve displaying error messages, warning messages, or dialog boxes to a user, or passing problem information to an external process, or writing error log entries in an error log. Problem reporting may also involve displaying a policy editor window and accepting input from the user that defines a modification to a policy that will make it satisfiable.

When all the policies are determined to be satisfiable, then in block 226 the process tests whether all the policies are feasible. Block 226 may involve carrying out the functions described above in connection with Policy Feasibility element 206. If not all policies are found to be feasible, then in block 234 the process reports unfeasibility information. The problem reporting steps may involve displaying error messages, warning messages, or dialog boxes to a user, or passing problem information to an external process, or writing error log entries in an error log. Problem reporting may also involve displaying a policy editor window and accepting input from the user that defines a modification to a policy that will make it feasible.

If all policies are found feasible, then in block 228 the process carries out configuration verification. Block 228 may involve carrying out the functions described above with respect to Configuration Verification element 208. At block 236, the policy verification process is complete and the process may return to a calling process within the network management system.

The process of FIG. 2B may be implemented in the form of one or more computer programs, processes, objects, or other software components, and may form a part of a policy-based network management system. The mechanism of FIG. 2A and the process of FIG. 2B may be implemented in the form of a Verification phase of the network management system that is carried out after policies are defined and before the network management system attempt to execute or apply the policies to the network. Alternatively, the Verification phase may be conducted as policies are entered or defined, although in this alternative the dynamic check of feasibility may be deferred until all the policies are entered.

HARDWARE OVERVIEW

Figure 3:
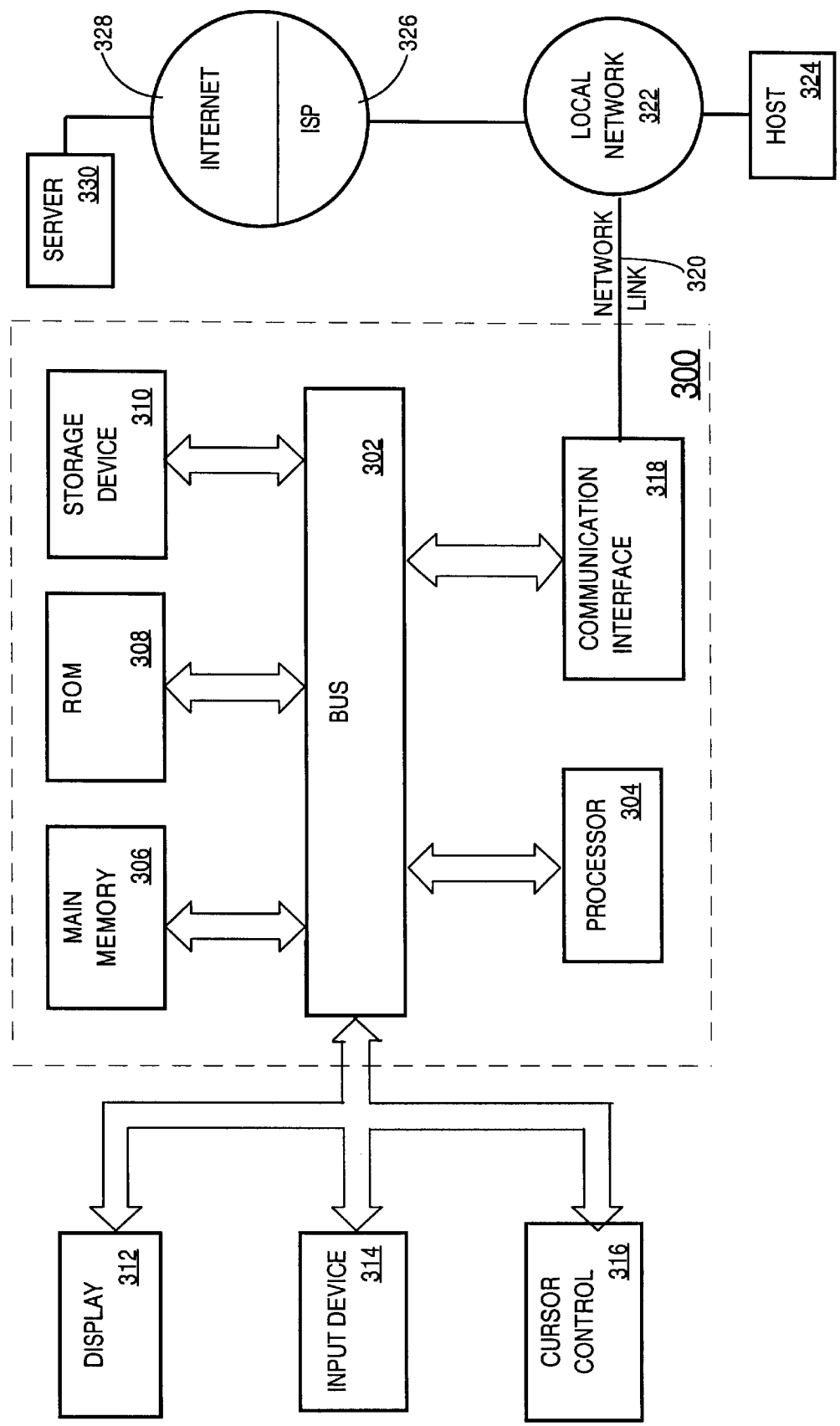
FIG. 3 is a block diagram of a computer system that can be used to implement the network management station of FIG. 1 and other aspects of the invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for recognizing and processing conflicts in policies that govern a policy-based system. According to one embodiment of the invention, recognizing and processing conflicts in policies is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for recognizing and processing conflicts in policies as described herein.

The received code may be executed by processor 304 as it is received, and/or stored in storage device 310, or other non-volatile storage for later execution. In this manner, computer system 300 may obtain application code in the form of a carrier wave.

In this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded as illustrative or exemplary rather than restrictive.

What is claimed is:

1. A method of verifying a policy used by a management system that manages a computer system, comprising the computer-implemented steps of:
    receiving configuration information that identifies one or more devices in the computer system and one or more characteristics of each of the devices;
    verifying that the policy is feasible for use with the computer system, based on the configuration information; and
    applying the policy to the computer system.

2. The method recited in claim 1, further comprising the computer-implemented steps of verifying that the computer system can satisfy the policy, based on the configuration information.

3. The method recited in claim 1, further comprising the computer-implemented steps of verifying that conditions and consequent actions of the policy may be applied to the computer system, based on the configuration information.

4. A method of a verifying a policy used by a management system that manages a network, comprising the steps of:
    (A) receiving information identifying a configuration of a routed data network under management and for converting the configuration information into a standard format;
    (B) receiving information defining the policy, the policy comprising a condition and a consequent to be applied to the network when the condition is true;
    (C) comparing the policy with the configuration information to determine whether the policy is feasible when applied to the network; and
    (D) generating information that identifies whether the policy is feasible.

5. The method recited in claim 4, wherein step (D) further comprises the steps of comparing the condition and consequent with the configuration information to determine whether the policy can be applied to the network.

6. The method recited in claim 5, wherein step (D) further comprises the steps of reporting whether, and if not why not, the policy can be applied to the network.

7. The method recited in claim 4, wherein step (C) further comprises the steps of reporting whether, and if not why not, the policy is unfeasible as applied to the network.

8. The method recited in claim 4, wherein step (D) further comprises the steps of comparing requirements, constraints and configurations specified by policies with one or more actual configurations of equipment or services of the network as specified in the configuration information.

9. A computer-readable medium carrying one or more sequences of instructions for verifying a policy used by a management system that manages a network, wherein execution of the one or more sequences of instructions by one or more processors causes the one or more processors to perform the steps of:
    (A) receiving information identifying a configuration of a routed data network under management and for converting the configuration information into a standard format;
    (B) receiving information defining at least one policy, comprising a condition and a consequent to be applied to the network when the condition is true;
    (C) comparing the policy with the configuration information to determine whether the policy is feasible when applied to the network; and
    (D) informing the network or a user thereof whether the policy is feasible.

10. The computer-readable medium recited in claim 9, wherein step (D) further comprises the steps of comparing the condition and consequent with the configuration information to determine whether the policy can be applied to the network.

11. The computer-readable medium recited in claim 10, wherein step (D) further comprises the steps of reporting whether, and if not why not, the policy can be applied to the network.

12. The computer-readable medium recited in claim 9, wherein step (C) further comprises the steps of reporting whether, and if not why not, the policy is unfeasible as applied to the network.

13. The computer-readable medium recited in claim 9, wherein step (D) further comprises the steps of comparing requirements, constraints and configurations specified by policies with one or more actual configurations of equipment or services of the network as specified in the configuration information.

14. A network management policy verification apparatus, comprising:
   first means for reading information identifying a configuration of a routed data network under management and for converting the configuration information into a standard format;
   information defining at least one policy, comprising a condition and a consequent to be applied to the network when the condition is true;
   second means for comparing the policy with the configuration information to determine whether the policy is feasible when applied to the network; and
   third means for informing the network or a user thereof whether the policy is feasible.

15. The apparatus recited in claim 14, wherein the third means further comprises means for comparing the condition and consequent with the configuration information to determine whether the policy can be applied to the network.

16. The apparatus recited in claim 15, wherein the third means further comprises means for reporting whether, and if not why not, the policy can be applied to the network.

17. The apparatus recited in claim 14, wherein the second means further comprises means for reporting whether, and if not why not, the policy is unfeasible as applied to the network.

18. The apparatus recited in claim 14, wherein the third means further comprises means to compare requirements, constraints and configurations specified by policies with one or more actual configurations of equipment or services of the network as specified in the configuration information.

19. An apparatus for verifying a policy used by a management system that manages a network, comprising:
   a network interface;
   a processor coupled to the network interface and receiving information from the network interface;
   a computer-readable medium accessible by the processor and comprising one or more sequences of instructions which, when executed by the processor, cause the processor to carry out the steps of:
      (A) receiving information identifying a configuration of a routed data network under management and for converting the configuration information into a standard format;
      (B) receiving information defining the policy, the policy comprising a condition and a consequent to be applied to the network when the condition is true;
      (C) comparing the policy with the configuration information to determine whether the policy is feasible when applied to the network; and
      (D) generating information that identifies whether the policy is feasible.

20. The apparatus recited in claim 19, wherein step (D) further comprises the steps of comparing the condition and consequent with the configuration information to determine whether the policy can be applied to the network.

21. The apparatus recited in claim 20, wherein step (D) further comprises the steps of reporting whether, and if not why not, the policy can be applied to the network.

22. The apparatus recited in claim 19, wherein step (C) further comprises the steps of reporting whether, and if not why not, the policy is unfeasible as applied to the network.

23. The apparatus recited in claim 19, wherein step (D) further comprises the steps of comparing requirements, constraints and configurations specified by policies with one or more actual configurations of equipment or services of the network as specified in the configuration information.

* * * * *